(12) United States Patent
Turon

(10) Patent No.: US 12,120,030 B2
(45) Date of Patent: Oct. 15, 2024

(54) NETWORK FILTERING WITH PRIVATE RESOLVABLE ADDRESSES

(71) Applicant: Google LLC, Mountain View, CA (US)

(72) Inventor: Martin A. Turon, Berkeley, CA (US)

(73) Assignee: Google LLC, Mountain View, CA (US)

( * ) Notice: Subject to any disclaimer, the term of this patent is extended or adjusted under 35 U.S.C. 154(b) by 410 days.

(21) Appl. No.: 17/637,396

(22) PCT Filed: Sep. 19, 2019

(86) PCT No.: PCT/US2019/051936
§ 371 (c)(1),
(2) Date: Feb. 22, 2022

(87) PCT Pub. No.: WO2021/054961
PCT Pub. Date: Mar. 25, 2021

(65) Prior Publication Data
US 2022/0368632 A1 Nov. 17, 2022

(51) Int. Cl.
*H04L 45/7453* (2022.01)
*H04L 9/32* (2006.01)
*H04L 101/618* (2022.01)

(52) U.S. Cl.
CPC ........ *H04L 45/7453* (2013.01); *H04L 9/3242* (2013.01); *H04L 2101/618* (2022.05)

(58) Field of Classification Search
CPC ............... H04L 45/7453; H04L 9/3242; H04L 2101/618
See application file for complete search history.

(56) References Cited

U.S. PATENT DOCUMENTS

| | | | |
|---|---|---|---|
| 9,473,941 B1 * | 10/2016 | Palin | H04W 12/069 |
| 2016/0226847 A1 | 8/2016 | Bone et al. | |
| 2018/0198752 A1 * | 7/2018 | Zhang | H04L 61/5038 |
| 2019/0108324 A1 * | 4/2019 | Graube | H04L 63/0861 |

FOREIGN PATENT DOCUMENTS

| | | |
|---|---|---|
| CN | 104704771 | 6/2015 |
| CN | 104717279 | 6/2015 |
| EP | 3318048 | 9/2019 |
| WO | 2018088952 | 5/2018 |
| WO | WO-2018088952 A1 * | 5/2018 |

(Continued)

OTHER PUBLICATIONS

"Foreign Office Action", KR Application No. 10-2022-7006685, Jan. 10, 2024, 5 pages.

(Continued)

*Primary Examiner* — Elton Williams
(74) *Attorney, Agent, or Firm* — Colby Nipper PLLC

(57) ABSTRACT

This document describes network filtering with private resolvable addresses in a wireless network. A source node in the wireless network hashes an identity resolving key and a value of a random number field to generate an address hash. The source node forms an advertisement address that includes a portion of the address hash and inserts the advertisement address in an advertising extension packet. The source node transmits the advertising extension packet over the wireless network, the address hash being usable by a destination node to filter the advertising extension packet.

20 Claims, 8 Drawing Sheets

(56) References Cited

FOREIGN PATENT DOCUMENTS

| WO | 2018197737 | 11/2018 |
| WO | 2021054961 | 3/2021 |

OTHER PUBLICATIONS

"Foreign Office Action", CN Application No. 201980099894.5, Dec. 18, 2023, 12 pages.

"International Preliminary Report on Patentability", Application No. PCT/US2019/051936, Mar. 15, 2022, 8 pages.

"Bluetooth Core Specification v5.0", Dec. 2016, pp. 2298, 2360-2363.

"Foreign Office Action", JP Application No. 2022-514243, Jun. 13, 2023, 4 pages.

"International Search Report and Written Opinion", Application No. PCT/US2019/051936, Apr. 23, 2020, 13 pages.

\* cited by examiner

NETWORK FILTERING WITH PRIVATE RESOLVABLE ADDRESSES

CROSS-REFERENCE OF RELATED APPLICATION

This application is a National Stage Entry of and claims priority to International Patent Application No. PCT/US2019/051936, filed on Sep. 19, 2019, the disclosure of which is incorporated by reference herein in its entirety.

BACKGROUND

Using low-power wireless networking, such as wireless mesh networking, to connect devices to each other and to cloud-based services is increasingly popular for sensing environmental conditions, controlling equipment, and providing information and alerts to users. In environments where multiple wireless networks share the same radio spectrum, utilize the same radio channelization, and/or use the same standardized communication protocols, a wireless device needs to filter received radio packets to determine if the radio packet is addressed to the wireless device or if the wireless device should ignore the received radio packet. Many devices on low-power wireless networks are designed to operate for extended periods of time on battery power, which limits the available computing, user interface, and radio resources in the devices. Processing radio packets that are ultimately ignored or dropped consumes the limited resources of the wireless device and may cause otherwise unnecessary retransmission of radio packets. Additionally, processing radio packets that are not of interest to the wireless device may cause the wireless device to fail to receive other radio packets that are of interest to the wireless device.

Additionally, many low-power wireless communication protocols may encrypt payload data but transmit addressing information in the clear. Transmitting unencrypted addressing information can reduce the cost and complexity of address filtering but reduces the privacy and security of communications within a wireless network.

SUMMARY

This document describes network filtering with private resolvable addresses in a wireless network. A source node in the wireless network hashes an identity resolving key and a value of a random number field to generate an address hash. The source node forms an advertisement address that includes a portion of the address hash and inserts the advertisement address in an advertising extension packet. The source node transmits the advertising extension packet over the wireless network, the transmitting being effective to direct a destination node to filter the advertising extension packet based at least in part on the address hash.

This summary is provided to introduce simplified concepts of network filtering with private resolvable addresses, generally related to addressing and routing. The simplified concepts are further described below in the Detailed Description. This summary is not intended to identify essential features of the claimed subject matter, nor is it intended for use in determining the scope of the claimed subject matter.

In aspects, methods, devices, systems, and means for network filtering with private resolvable addresses in a wireless network are described in which a source node hashes an identity resolving key and a value of a random number field to generate an address hash, the identity resolving key being cryptographically-derived from address-generation input data. The source node forms an advertisement address that includes a portion of the address hash and inserts the advertisement address in an advertising extension packet. The source node transmits the advertising extension packet over the wireless network, the address hash being usable by a destination node to filter the advertising extension packet.

In aspects, methods, devices, systems, and means for network filtering with private resolvable addresses in a wireless network are described in which a destination node receives an advertising extension packet from a source node in the wireless network. The destination node generates a first local hash value based on a value of a random number field included in the received advertising extension packet and a first local filtering identity resolving key. The destination node compares the first local hash value to a hash value included in the advertising extension packet to determine if the first local hash value matches the hash value included in the advertising extension packet. If the first local hash value matches the hash value included in the advertising extension packet, the destination node receives a protocol data unit on a data channel and at a time indicated in the advertising extension packet. If the first local hash value does not match the hash value included in the advertising extension packet, the destination node discards the received advertising extension packet and scans one or more advertising channels for another advertising extension packet.

BRIEF DESCRIPTION OF THE DRAWINGS

Embodiments of network filtering with private resolvable addresses are described with reference to the following drawings. The same numbers are used throughout the drawings to reference like features and components.

DETAILED DESCRIPTION

Figure 1:
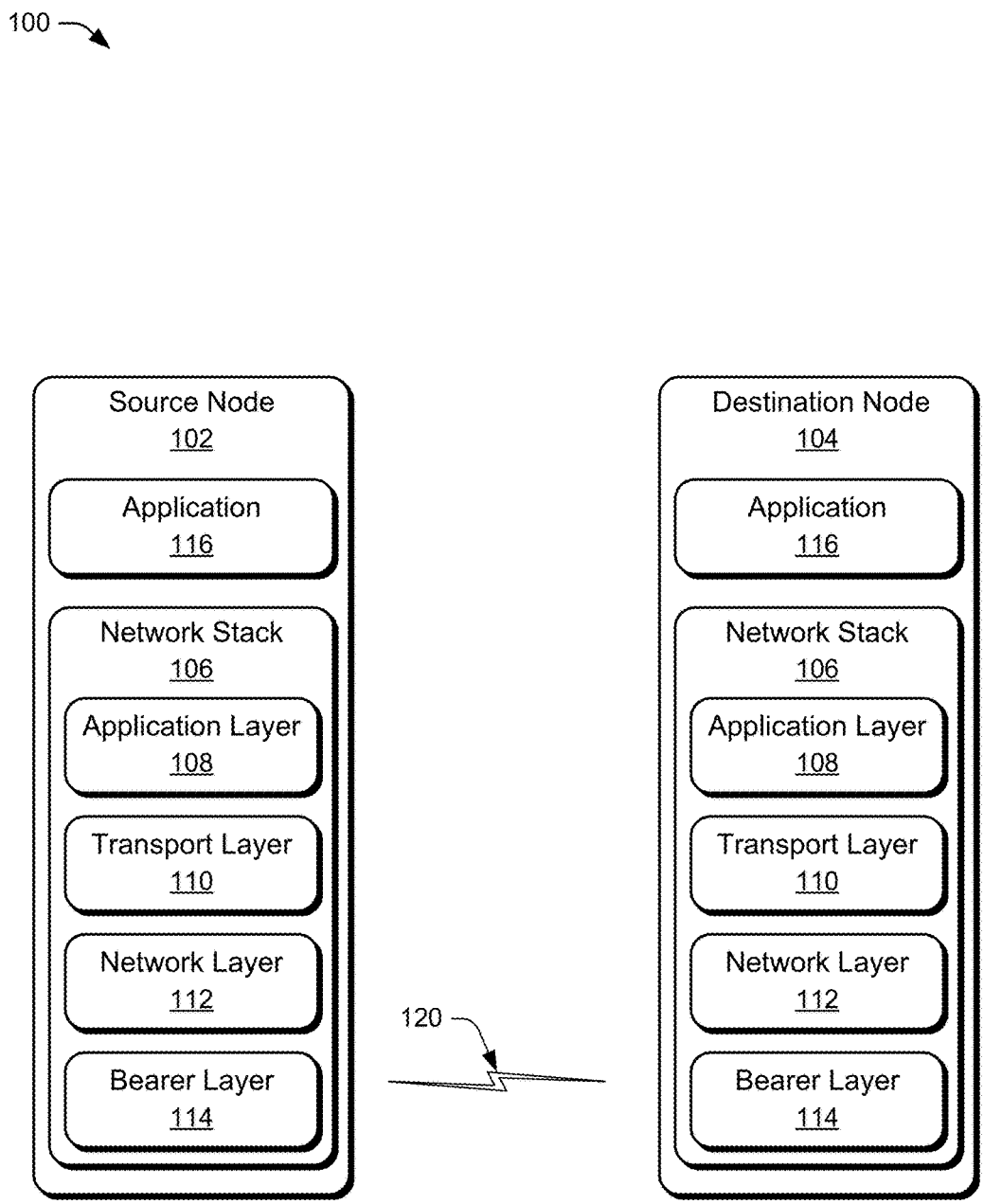
FIG. 1 illustrates an example wireless network system in which various embodiments of network filtering with private resolvable addresses can be implemented.

Low-power wireless networks operate using a variety of topologies, such as a star topology, a mesh topology, or the like. Low-power wireless networks can be based on proprietary technologies, or standards-based technologies. For example, wireless mesh networks may be based on the IEEE 802.15.4 standard, which defines physical (PHY) layer and Media Access Control (MAC) layer features and services for use by applications at higher layers of a mesh networking stack. Upper-layer applications rely on these standards-defined services to support addressing and routing of packet data to support application-level communication across a mesh network and between the mesh network and external networks.

Similarly, other wireless network technologies, such as Bluetooth®, Thread®, ZigBee®, Z-Wave®, Bluetooth® Low Energy (BLE), or the like, have similar layered networking stacks. For example, BLE defines an application layer, a transport layer, a network layer, and a bearer layer. The bearer layer defines how network messages are transported between nodes of the wireless network. The network layer defines how messages are addressed to wireless network nodes, defines the network message format that is transported by the bearer layer, and defines how the application payload is included with the network message. The transport layer defines the format of the application payload and how the application payload is encrypted and authenticated. The application layer defines how applications use the transport layer and defines the operations and behavior of applications.

To facilitate communications to multiple devices in a wireless network, some low-power wireless systems utilize broadcast transmission mechanisms to communicate with other devices in a power-efficient manner. For example, BLE uses an advertising technique in which a wireless device (wireless node) transmits advertisements on three advertising channels. Other wireless devices can scan the advertising channels to receive the advertisement. The advertisement packet has a small data payload (e.g., 31 bytes of data). In the case of a BLE mesh network, the advertisements are transmitted using a broadcast address as the destination address.

To expand the amount of data that can be transmitted using an advertisement, advertising extensions enable transmitting additional advertising extension data packets on additional channels (e.g., 37 other BLE channels, advertising extension data channels). The Protocol Data Unit (PDU) for an advertising extension data packet carries a larger data payload (e.g., up to 255 bytes), and advertising extension data packets can be chained together to communicate even larger amounts of data. By shifting the transmission of data to advertising extension data packets on data channels in the wireless network, congestion on the advertising channels is reduced.

In congested environments where there are multiple BLE networks operating and sharing the same advertising channels, a wireless device in a first wireless network may scan the advertising channels and receive an advertisement from a second wireless network. If that second-wireless-network advertisement causes the wireless device to hop to another radio channel to receive an advertising extension data packet, the wireless device will not be scanning the advertising channels for messages in the first wireless network. If the advertising extension data packet is meant for wireless devices in the second wireless network, the wireless device may miss advertising packets in the first wireless network while it is receiving the advertising extension data packet intended for the wireless devices in the second wireless network.

By encoding device address information, as a resolvable private address, in the address field of an advertising extension packet, the wireless device can use address filtering to determine if an advertising extension packet is addressed to the wireless device without hopping to a different radio channel and receiving the adverting extension data packet. Network filtering with private resolvable addresses reduces the power consumption of wireless network devices by eliminating the unnecessary reception and evaluation of data packets that are not destined for the wireless device. The cryptographically-based address generation of private resolvable addresses improves data privacy by eliminating destination addresses transmitted in the clear in data packets.

While features and concepts of the described systems and methods for network filtering with private resolvable addresses can be implemented in any number of different environments, systems, devices, and/or various configurations, embodiments of network filtering with private resolvable addresses are described in the context of the following example devices, systems, and configurations.

Example Environment

FIG. 1 illustrates an example wireless network 100 in which various embodiments of network filtering with private resolvable addresses can be implemented. The wireless network 100 includes a first wireless network device acting as a source node 102 and a second wireless network device acting as a destination node 104. The source node 102 and the destination node 104 are wireless network devices, as described below with respect to FIG. 8, which include a wireless network interface for communication over the wireless network 100. The source node 102 and the destination node 104 receive and transmit packet data over the wireless network, shown at 120, using the wireless network interface. The source node 102 and the destination node 104 can also route, forward, and/or relay packets across the wireless network 100.

The source node 102 and the destination node 104 are shown as including a network stack 106. The network stack 106 includes an application layer 108, a transport layer 110, a network layer 112, and a bearer layer 114. The network stack 106 is shown in this example with four layers, but, as is well known, the network stack 106 may alternatively have fewer or more layers. The operations described with respect to specific layers below may alternatively be performed at other layers, partitioned between multiple layers, or combined from multiple layers to a single layer.

The source node 102 and the destination node 104 include one or more applications 116 that use the network stack 106 to communicate over the wireless network 100. The application 116 is a logical grouping of related functions, which may also be described as a model, a profile, a cluster, and so forth. The application layer 108 defines how the application 116 uses the transport layer 110. The application layer 108 passes the application data and configuration information to the transport layer 110.

The transport layer 110 sends the application payload to the network layer 112. The network layer 112 determines how the wireless network packet is addressed and how the application payload is included in the wireless network packet. The network layer 112 forms a destination address (DST) for the wireless network packet. For example, for an advertising extension packet or an advertising extension data packet, the network layer 112 encodes a resolvable private address for the DST and inserts the resolvable private address into the advertising extension packet, as described in greater detail below. The network layer 112 sends the wireless network packet to the bearer layer 114. The bearer layer 114 transmits the wireless network packet over the wireless network 100.

The destination node 104 receives the wireless network packet from the wireless network 100 at the bearer layer 114. The bearer layer 114 passes the received wireless network packet to the network layer 112. In the case of the wireless network packet being an advertising extension packet or an advertising extension data packet, the network layer 112 determines that the destination address is a resolvable private address and determines if the resolvable private address corresponds to an address of the destination node 104. If the resolvable private address corresponds to the address of the destination node 104, the network layer 112 sends the application payload from the packet to the transport layer 110. The transport layer 110 sends the application payload to the application 116 at the application layer 108 in the destination node 104.

Figure 2:
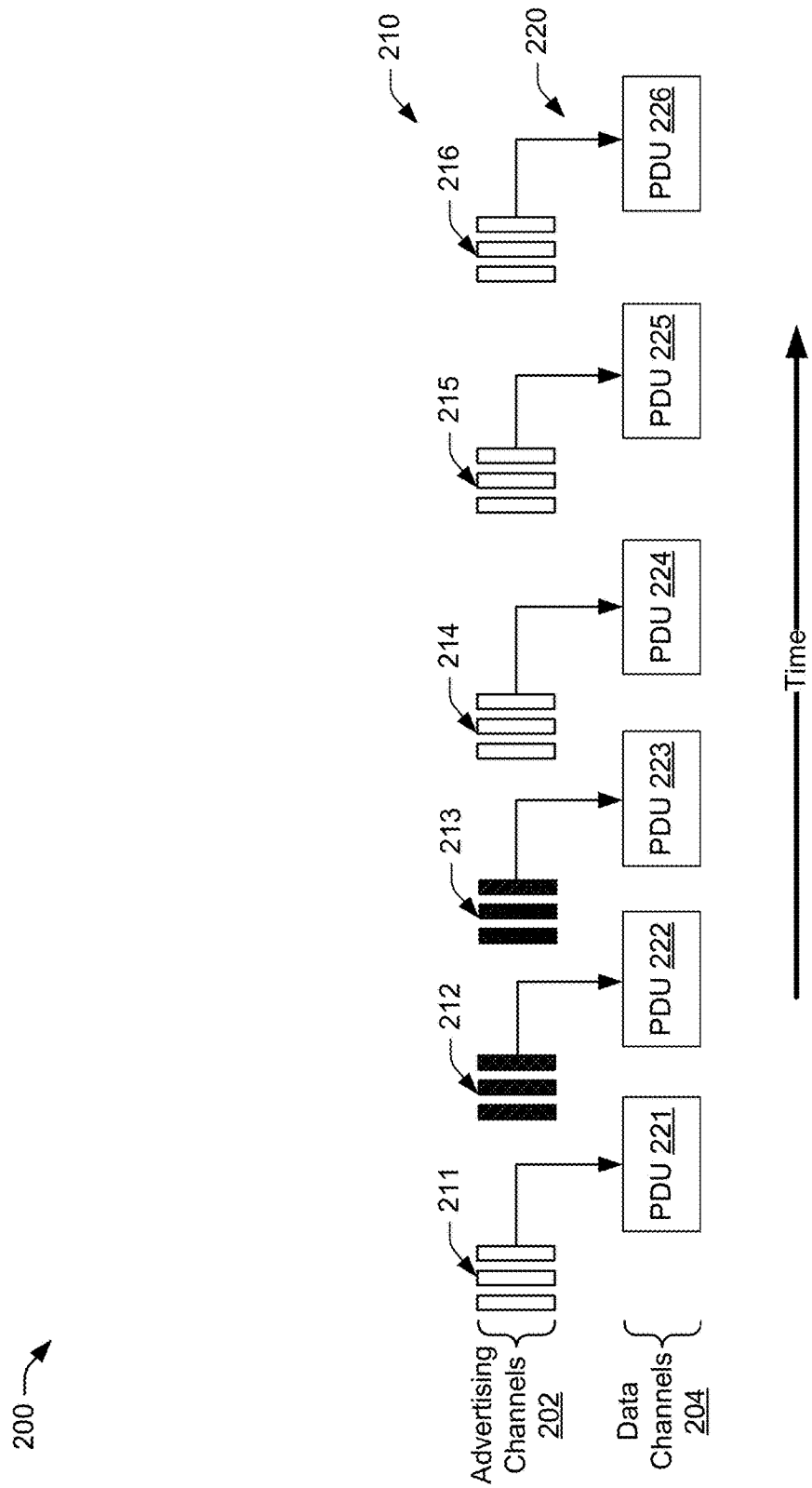
FIG. 2 illustrates an example of advertising extensions communicated in a wireless network in accordance with various embodiments of network filtering with private resolvable addresses.

FIG. 2 illustrates an example of advertising extensions communicated in a wireless network in accordance with various embodiments of network filtering with private resolvable addresses. FIG. 2 illustrates advertising extensions 210 transmitted on advertising channels 202 and advertising extension data PDUs 220 transmitted on data channels 204 by wireless network devices in the wireless network 100, as shown and described with reference to FIG. 1.

In the wireless network 100 there are multiple radio channels with a portion of the radio channels designated as advertising channels (e.g., the advertising channels 202) and the remaining radio channels designated as data channels (e.g., the data channels 204. For example, in BLE networks, radio channels 0 to 36 are designated as data channels and radio channels 37, 38, and 39 are designated advertising channels.

In aspects, a wireless network device, such as the source node 102, transmits an advertising extension on one or more of the advertising channels 202 to indicate that the source node 102 will transmit an advertising extension data PDU 220 on one of the data channels 204. For example, the source node 102 transmits an advertising extension 211 on the advertising channels 202 (shown as the three vertical bars that corresponds to transmissions on the three BLE advertising channels) that indicates the source node 102 will transmit an advertising extension data PDU 221. The advertising extension includes an indication (e.g., an advertising pointer or ADV_EXT_IND) of which one of the data channels 204 the source node 102 will use for the transmission of the advertising extension data PDU 221 and a time at which the source node 102 will transmit the advertising extension data PDU 221.

Another wireless network device, such as the destination node 104, scans the advertising channels 202 to receive the advertising extension 211. Based on receiving the advertising extension 211, the destination node 104 can determine the radio channel and the timing to receive the advertising extension data PDU 221.

Two different wireless networks can operate in the same geographic area. For example, the source node 102 and the destination node 104 are part of a first wireless network. Advertising extensions 210 for the first wireless network (illustrated as white rectangles in FIG. 2) correspond to the advertising extensions 211, 214, 215, and 216. Other wireless devices in a second wireless network share the advertising channels 202 and the data channels 204 with the first wireless network. A wireless network device in the second wireless network can transmit advertising extensions 212 and 213, illustrated as black rectangles in FIG. 2.

In the event that the destination node 104 receives the advertising extension 212 and/or 213, the destination node 104 will attempt to receive the respective advertising extension data PDUs 222 and/or 223 that are intended for devices in the second wireless network. For example, if the destination node 104 receives the advertising extension 213 and changes (hops) to the data channel 204 indicated in the advertising extension 213, the destination node 104 will be attempting to receive the advertising extension data PDU 223 at the same time the source node 102 is transmitting the advertising extension 214. The destination node 104 will not be scanning the advertising channels 202 when the source node 102 transmits the advertising extension 214 and the destination node 104 will miss receiving the advertising extension 214 and the associated advertising extension data PDU 224.

Figure 3:
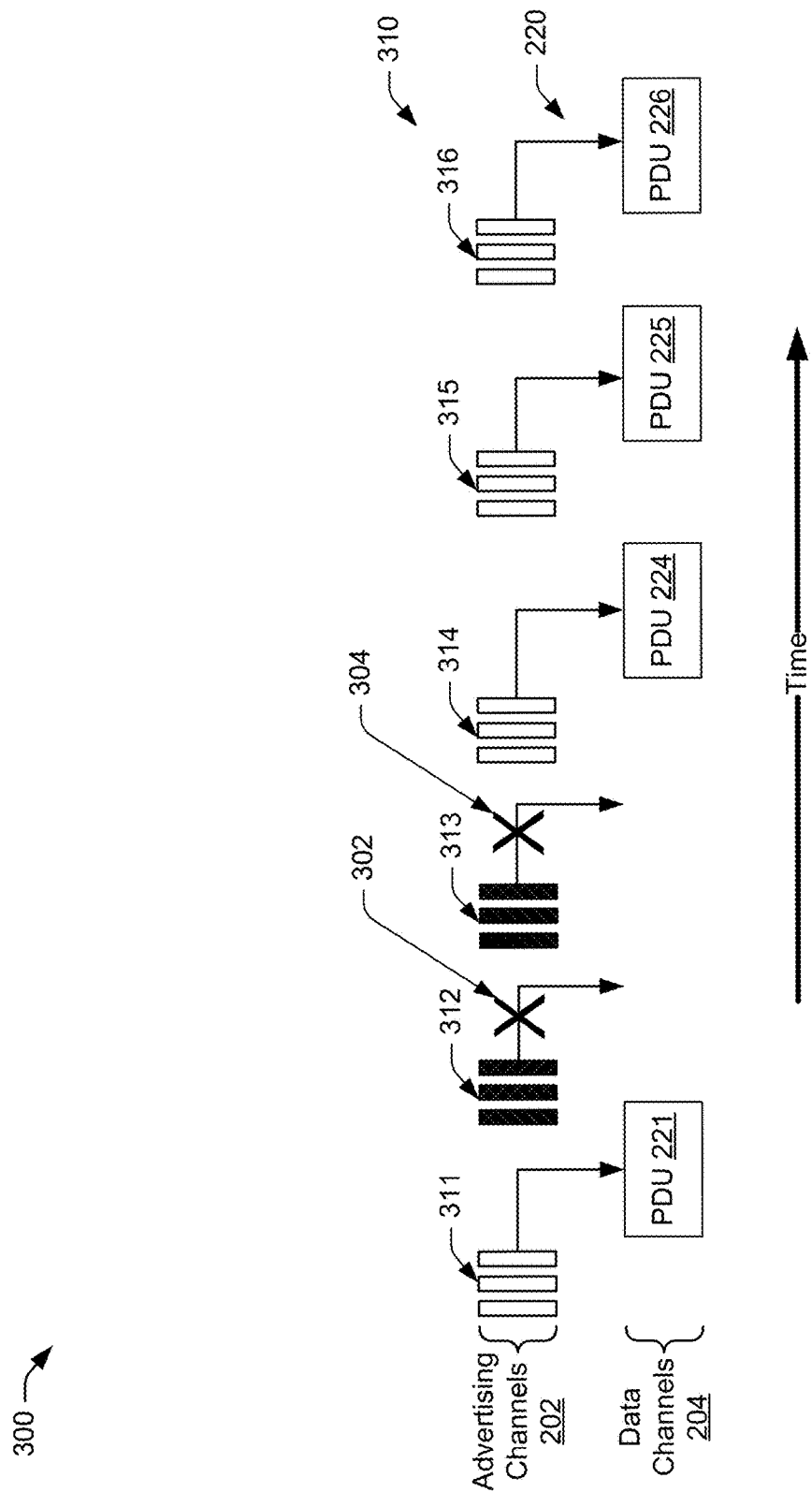
FIG. 3 illustrates another example of advertising extensions communicated in a wireless network in accordance with various embodiments of network filtering with private resolvable addresses.

FIG. 3 illustrates another example of advertising extensions communicated in a wireless network in accordance with various embodiments of network filtering with private resolvable addresses. FIG. 3 illustrates filtering advertising extensions 210 transmitted on advertising channels 202 by wireless network devices in the wireless network 100, as shown and described with reference to FIG. 1.

In aspects, to improve the availability of the destination node 104 to receive advertising extension data PDUs 220 that are intended for the destination node 104, the advertising extensions 310 include a resolvable private address. The destination node 104 generates a local hash value based on a portion of the resolvable private address (described in greater detail below) and compares the local hash value to one or more hash values generated from respective filtering Identity Resolving Keys ($IRK_{filt}$) stored in the destination node 104. If there is a match between the local hash value and one of the hash values generated from the filtering IRKs, the destination node 104 then uses the indication (e.g., an advertising pointer or ADV_EXT_IND) in the advertising extension 310 to hop to a data channel to receive an advertising extension data PDU 220. If there is not a match between the local hash value and one of the hash values generated from the filtering IRKs, the destination node 104 then discards the advertising extension 310 and resumes scanning the advertising channels 202 to receive other advertising extensions.

For example, the destination node 104 receives the advertising extension 311, generates a local hash value based on a portion of the resolvable private address included in the advertising extension 311, determines that the local hash value matches a hash value generated from a stored filtering IRK, and hops to the indicated data channel 204 to receive the advertising extension data PDU 221. The destination node 104 resumes scanning the advertising channels and receives the advertising extension 312. The destination node 104 generates a local hash value based on a portion of the resolvable private address included in the advertising extension 312, determines that the local hash value does not match a local hash value generated from a stored filtering IRK (shown at 302), discards the advertising extension 312, and resumes scanning the advertising channels 202. Likewise, the destination node 104 receives the advertising extension 313, determines that a local hash value does not match a local hash value generated from a stored filtering IRK (shown at 304) for the resolvable private address included in the advertising extension 313, discards the advertising extension 313, and resumes scanning the advertising channels 202. By filtering addresses of the advertising extensions, the destination node 104 increases its availability to receive advertising extension packets intended for the destination node 104.

Continuing with the example, the destination node 104 receives the advertising extensions 314, 315, and 316, generates respective local hash values based on a portion of the resolvable private address included in the advertising extensions 314, 315, and 316, determines that the respective local hash values match a hash value generated from one or more stored filtering IRKs, and hops to the indicated data channel(s) 204 to receive the advertising extension data PDUs 224, 225, and 226.

Resolvable Private Address Filtering

Figure 4:
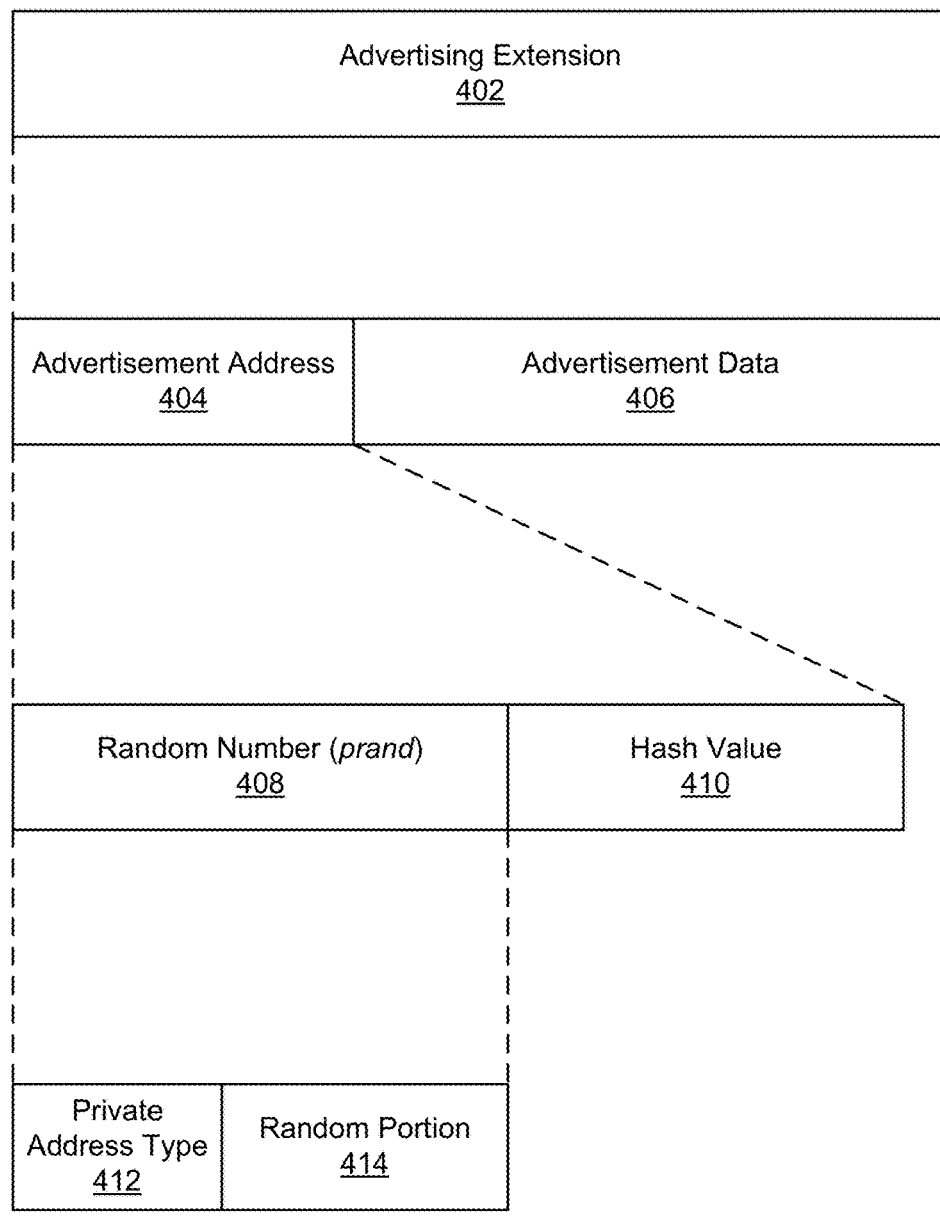
FIG. 4 illustrates an example mesh network packet for various embodiments of network filtering with private resolvable addresses.

FIG. 4 illustrates an example wireless network packet 400 for various embodiments of network filtering with private resolvable addresses techniques. The advertising extension packet 402 includes a number of fields, the contents of which are determined by the various layers of the network stack 106. The various fields in the packet 400 are shown for illustrative purposes and may vary in length and/or location within the packet 400.

In aspects, the advertising extension packet 402 includes an advertisement address field 404 (e.g., a Bluetooth Device Address (BDADDR)) and an advertisement data field 406. For example, the advertisement address field 404 is six bytes in length and the advertisement data field 406 can vary in length from zero bytes to 31 bytes. The advertisement data field 406 can include the indication (e.g., an advertising pointer or ADV_EXT_IND) of which one of the data channels 204 the source node 102 will use for the transmission of the advertising extension data PDU 221 and a time at which the source node 102 will transmit the advertising extension data PDU 221.

The advertisement address field 404 includes a random number field 408 (e.g., prand as defined in the Bluetooth Core Specification, Version 5.0, Volume 6, Part B, 1.3.2.2) and a hash value field 410. The random number field 408 includes two portions, a private address type field 412 that indicates the type of advertisement address and a random portion field 414. The private address type field 412 is two bits in length and is set to the binary value "01" to indicate that the advertisement address is a resolvable private address. The two-bits of the private address type field 412 are the most significant two bits of the prand. The source node 102 generates a random number as the value of the random portion field 414. The random portion 414 is included as the 22 least significant bits of the prand. The source node 102 forms the prand by concatenating the private address type field 412 and the random portion 414, shown in binary form as "0b 01vv vvvv vvvv vvvv vvvv vvvv," where "v" is a bit in the random portion 414. The use of the prand in the advertisement address 404 ensures privacy by providing that no two messages transmitted over the air will use the same advertisement address.

The source node 102 generates the value of the hash value field 410 using a hash function that takes the prand and a filtering Identity Resolving Key ($IRK_{filt}$) as inputs:

$$\text{Hash}=ah(IRK_{filt},\text{prand}) \quad (1)$$

where ah is a random address hash function.

The source node 102 generates an $IRK_{filt}$ that encodes a network identifier (NID) and/or a destination address (DST):

$$IRK_{filt}=\text{AES-CMAC}_k(m) \quad (2)$$

where k is a 128-bit filter key (FilterKey) derived from a 128-bit Network Key (NetKey) that is shared between a set of nodes (e.g., the source node 102 and the destination node 104) that together form a wireless network (e.g., the wireless network 100) and is used for the generation of IRKs. Address-generation input data, m, can take several forms based on a network type and/or an address type. The elements that may be included in the address-generation input data are a network identifier (NID) for the wireless network of the source node 102 and the destination node 104, an address-type field, a short unicast (16-bit) address (DST16), a long unicast (64-bit) address (DST64), or a combination thereof. The elements of the address-generation input data, m, are illustrated in the following equations, where if there is more than one element of the address-generation input data used, the elements are concatenated. For a broadcast address, the broadcast address includes the address-type field and a network identifier:

$$m=m_{broadcast}=0x00||NID \text{ (16 bit)} \quad (3)$$

For a long unicast address, the long unicast address includes the address-type field, a network identifier, and a DST64:

$$m=m_{long}=0x01||NID||DST64 \quad (4)$$

For a short unicast address, the short unicast address includes the address-type field, a network identifier, and a DST16:

$$m=m_{short}=0x02||NID||DST16 \quad (5)$$

For some types of networks, such as a wireless mesh network that communicates using message flooding, the nodes in the network may filter based on solely on the network identifier. In this case the address-generation input data may include only a 128-bit network identifier:

$$m=m_{network}=NID \text{ (128 bit)} \quad (6)$$

The $IRK_{filt}$ is 128 bits in length and the source node 102 pads the 24-bit prand with 104 bits of padding to generate the random address hash value:

$$\text{prand'}=\text{padding}||\text{prand} \quad (7)$$

The output of the random address hash function ah is:

$$ah(IRK_{filt},\text{prand})=e(IRK_{filt},\text{prand'})\bmod 2^{24} \quad (8)$$

where e is a security function and the output of e is truncated to 24 bits by taking the least significant 24 bits of the output of e as the result of ah. The security function e generates 128-bit encrypted data from a 128-bit key (the $IRK_{filt}$) and 128-bit plaintext data (the prand') using the AES-128-bit block cypher as defined in the Federal Information Processing Standards Publication 197 (FIPS-197):

$$\text{encryptedData}=e(\text{key},\text{plaintextData}) \quad (9)$$

For each advertising extension packet 402 the destination node 104 receives, the destination node 104 generates a local hash value using the hash function ah with the prand (random number 408) from the received advertising extension packet 402 and a local filtering Identity Resolving Key (local $IRK_{filt}$) as inputs to the hash function ah. If the local hash value matches the hash value 410 in the received advertising extension packet 402, the destination node 104 then uses the indication (e.g., an advertising pointer or ADV_EXT_IND) in the advertisement data 406 of the received advertising extension packet 402 to hop to a data channel 204 to receive a PDU 210. If there is not a match between the local hash value and the hash value 410 in the received advertising extension packet 402, the destination node 104 discards the advertising extension packet 402 and resumes scanning the advertising channels 202.

The destination node 104 can have multiple local filtering IRKs to compare to the hash value 410 in the received advertising extension packet 402. For example, the destination node 104 may have respective local filtering IRKs for a short address, a long address, a broadcast address, an application-specific address, a multicast address, and so forth.

For example, the destination node 104 can maintain the local filtering IRKs in a memory of the destination node 104 and using any suitable data structure, such as a list of local filtering IRKs. If there is not a match between a first local hash value for a first local $IRK_{filt}$ and the hash value 410 in the received advertising extension packet 402, the destination node 104 generates a second local hash value for a second local $IRK_{filt}$ and compares the second local hash value for the second local $IRK_{filt}$ and the hash value 410 in the received advertising extension packet 402 to determine if there is a match. The destination node 104 continues generating local hash values and comparing the local hash values to the hash value 410 in the received advertising extension packet 402 until the destination either finds a match and hops to a data channel to receive an advertising extension data PDU 210, or exhausts the list of local filtering IRKs and resumes scanning the advertising channels 202.

Example Methods

Example methods 500 and 600 are described with reference to respective FIGS. 5 and 6 in accordance with one or more embodiments of network filtering with private resolvable addresses. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
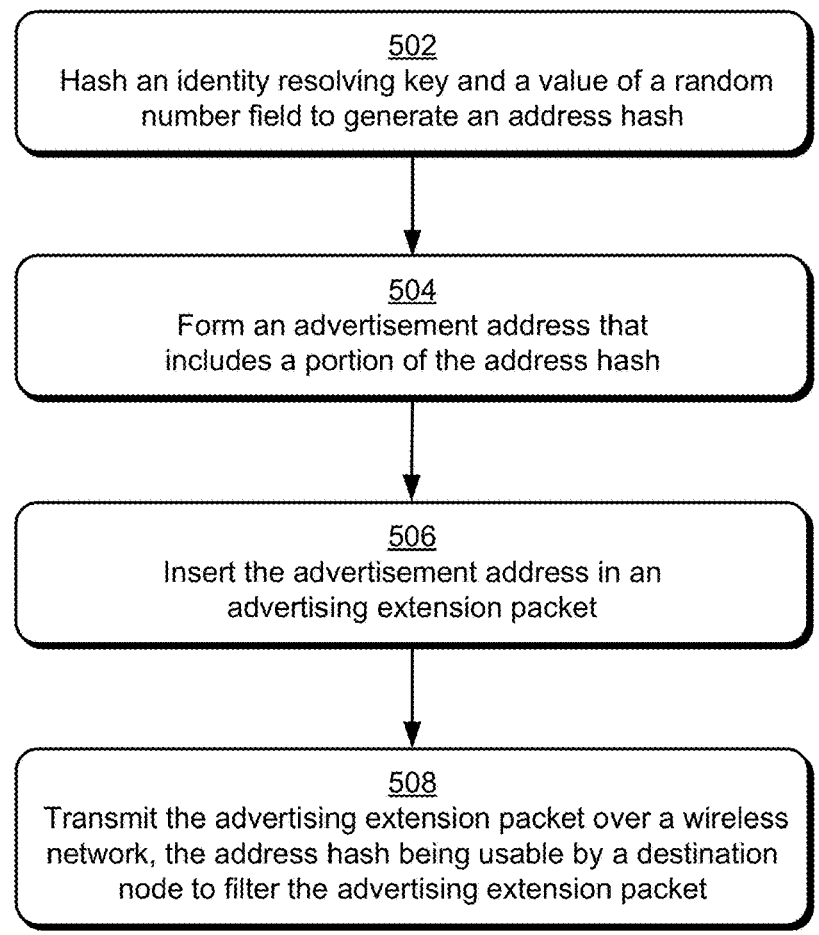
FIG. 5 illustrates an example method of network filtering with private resolvable addresses in accordance with embodiments of the techniques described herein.

FIG. 5 illustrates example method(s) 500 of network filtering with private resolvable addresses as generally related to a source node in a wireless network. At block 502, a source node hashes an identity resolving key and a value of a random number field to generate an address hash. For example, a source node (e.g., the source node 102) hashes a filtering Identity Resolving Key (e.g., the $IRK_{filt}$) and a value of a random number field (e.g., the prand, the random number field 408) to generate an address hash (e.g., the hash value 410), as described above in equation 1.

At block 504, the source node forms an advertisement address that includes a portion of the address hash. For example, the source node forms an advertisement address (e.g., the advertisement address 404) that includes a portion of the address hash, as described in equation 8.

At block 506, the source node inserts the advertisement address in an advertising extension packet. For example, the source node inserts the advertisement address in an advertising extension packet (e.g., the advertising extension 402).

At block 508, the source node transmits the advertising extension packet over a wireless network, the address hash being usable by a destination node to filter the advertising extension packet. For example, the source node transmits the advertising extension packet over a wireless network (e.g., the wireless network 100), the address hash being usable by a destination node (e.g., the destination node 104) to filter the advertising extension packet based at least in part on the address hash. The source node transmits the advertising extension packet over one or more of the advertising channels 202.

Figure 6:
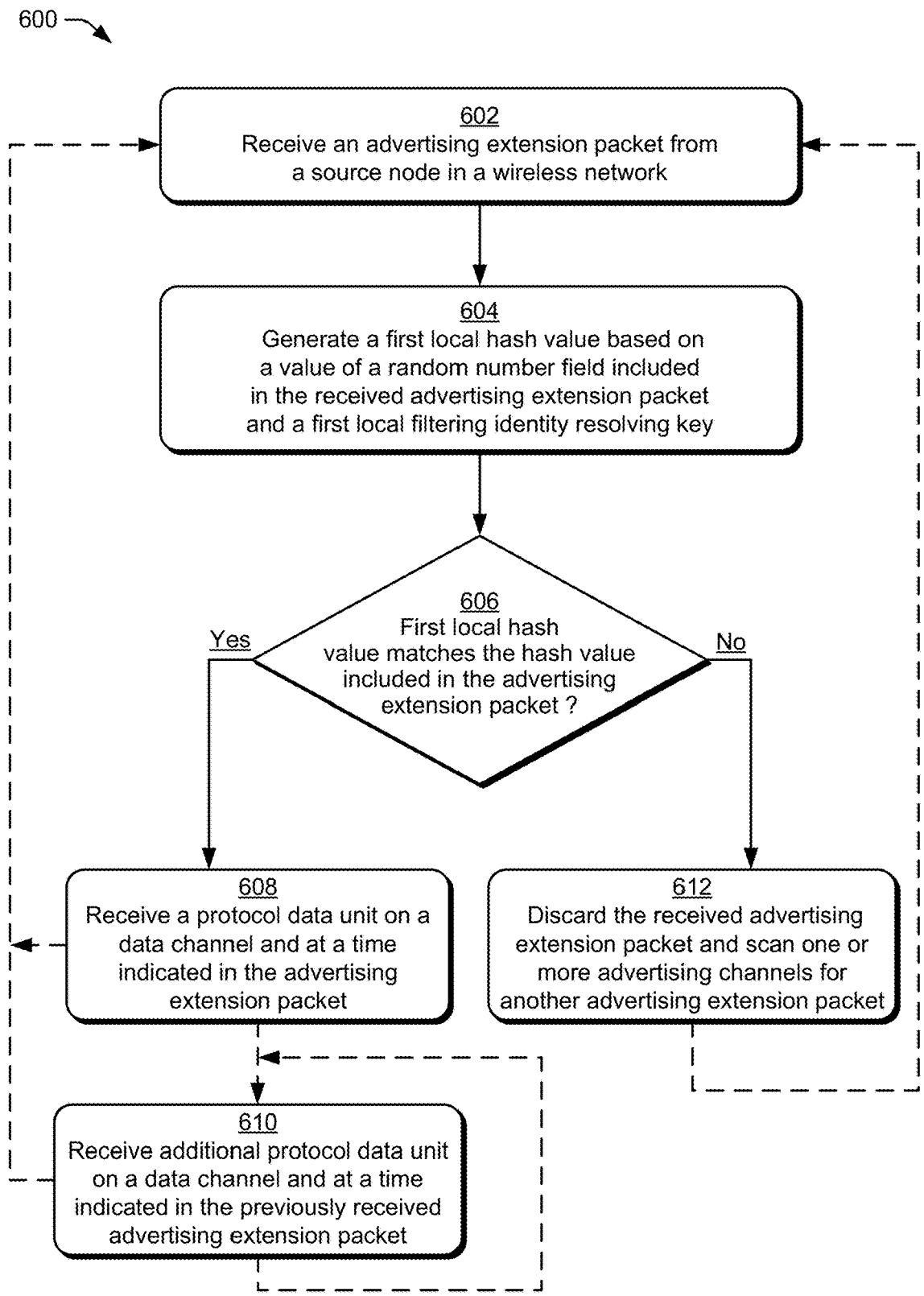
FIG. 6 illustrates another example method of network filtering with private resolvable addresses in accordance with embodiments of the techniques described herein.

FIG. 6 illustrates example method(s) 600 of network filtering with private resolvable addresses as generally related to a destination node in a wireless network. At block 602, a destination node receives an advertising extension packet from a source node in a wireless network. For example, a destination node (e.g., the destination node 104) receives an advertising extension packet (e.g., the advertising extension 402) from a source node (e.g., the source node 102) in a wireless network (e.g., the wireless network 100). The destination node receives advertising extension packet over one of the advertising channels 202.

At block 604, the destination node generates a first local hash value based on a value of a random number field included in the received advertising extension packet and a first local filtering identity resolving key. For example, the destination node hashes a value of a random number field (e.g., the prand, the random number field 408) in the received advertising extension packet and a filtering identity resolving key (e.g., the $IRK_{filt}$) to generate a first local hash value, as described above in equation 1.

At block 606, the destination node compares the first local hash value to a hash value included in the advertising extension packet to determine if the first local hash value matches the hash value included in the advertising extension packet. For example, the destination node compares the first local hash value to a hash value (e.g., the hash value 410) included in the advertising extension packet to determine if the first local hash value matches the hash value included in the advertising extension packet.

If the first local hash value matches the hash value included in the advertising extension packet, the destination node receives, at block 608, a protocol data unit on a data channel and at a time indicated in the advertising extension packet. For example, the destination node hops to a data channel (e.g., a data channel 204) and receives an advertising extension data PDU (e.g., a PDU 220) on the data channel and at a time indicated in the advertising extension packet. If the received advertising extension data PDU includes an advertising pointer that points to an additional advertising extension data PDU (e.g., a next advertising extension data PDU in a chain of advertising extension data PDUs), the destination node receives, at block 610, the additional protocol data unit on a data channel and at a time indicated in the previously received advertising extension packet. If the additional advertising extension data PDU also includes an advertising pointer that points to a next advertising extension data PDU in a chain of advertising extension data PDUs, the destination node loops through the block 610 until it receives the last advertising extension data PDU in the chain of advertising extension data PDUs. At blocks 608 and 610, if there are no additional advertising extension data PDUs to receive (e.g., the most recently received advertising extension data PDU does not include an advertising pointer), the destination node resumes scanning one or more advertising channels for another advertising extension packet, at block 602.

If the first local hash value does not match the hash value included in the advertising extension packet, the destination node, at block 612, discards the received advertising extension packet and scans one or more advertising channels for another advertising extension packet, at block 602. For example, the destination node discards the received advertising extension packet and scans one or more advertising channels (e.g., the advertising channels 202) for another advertising extension packet. If the destination node receives another advertising extension packet, the process continues at 602.

Example Environment

Figure 7:
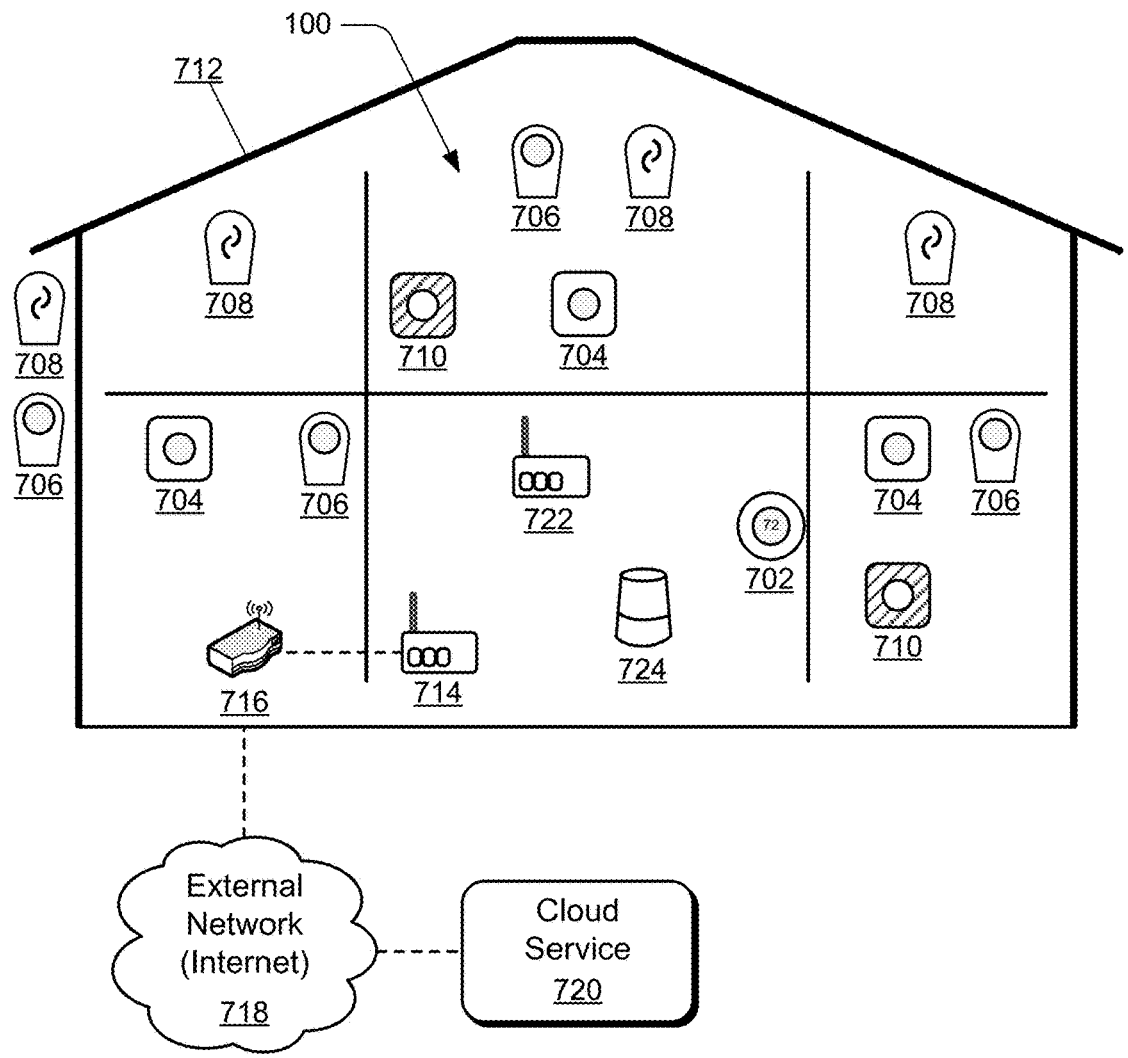
FIG. 7 illustrates an example environment in which a wireless network can be implemented in accordance with embodiments of the techniques described herein.

FIG. 7 illustrates an example environment 700 in which the wireless network 100 (as described with reference to FIG. 1), and embodiments of network filtering with private resolvable addresses can be implemented. Generally, the environment 700 includes the wireless network 100, implemented as part of a smart-home or other type of structure with any number and type of wireless network devices that are configured for communication in a wireless network, such a wireless network with a star, mesh, or other topology. For example, the wireless network devices can include a thermostat 702, hazard detectors 704 (e.g., for smoke and/or carbon monoxide), cameras 706 (e.g., indoor and outdoor), lighting units 708 (e.g., indoor and outdoor), and any other types of wireless network devices 710 that are implemented inside and/or outside of a structure 712 (e.g., in a smart-home environment). In this example, the wireless network devices can also include any of the previously described devices, such as a node 102.

In the environment 700, any number of the wireless network devices can be implemented for wireless interconnection to wirelessly communicate and interact with each other. The wireless network devices are modular, intelligent, multi-sensing, network-connected devices, which can integrate seamlessly with each other and/or with a central server or a cloud-computing system to provide any of a variety of useful smart-home objectives and implementations. An example of a wireless network device that can be implemented as any of the devices described herein is shown and described with reference to FIG. 7.

In implementations, the thermostat 702 may include a Nest® Learning Thermostat that detects ambient climate characteristics (e.g., temperature and/or humidity) and controls a HVAC system in the smart-home environment. The learning thermostat 702 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 704 can be implemented to detect the presence of a hazardous substance or a substance indicative of a hazardous substance (e.g., smoke, fire, or carbon monoxide). In examples of wireless interconnection, a hazard detector 704 may detect the presence of smoke, indicating a fire in the structure, in which case the hazard detector that first detects the smoke can broadcast a low-power wake-up signal to all of the connected wireless network devices. The other hazard detectors 704 can then receive the broadcast wake-up signal and initiate a high-power state for hazard detection and to receive wireless communications of alert messages. Further, the lighting units 708 can receive the broadcast wake-up signal and activate in the region of the detected hazard to illuminate and identify the problem area. In another example, the lighting units 708 may activate in one illumination color to indicate a problem area or region in the structure, such as for a detected fire or break-in, and activate in a different illumination color to indicate safe regions and/or escape routes out of the structure. In another example, a doorbell or door monitoring system may include LEDs that flash yellow (or other color) when a presence is detected, or flash red if an alarm is activated.

In various configurations, the wireless network devices 710 can include an entryway interface device that functions in coordination with a network-connected door lock system, and that detects and responds to a person's approach to or departure from a location, such as an outer door of the structure 712. The entryway interface device can interact with the other wireless network devices based on whether someone has approached or entered the smart-home environment. An entryway interface device can control doorbell functionality, announce the approach or departure of a person via audio or visual means, and control settings on a security system, such as to activate or deactivate the security system when occupants come and go. The wireless network devices 710 can also include other sensors and detectors, such as to detect ambient lighting conditions, detect room-occupancy states (e.g., with an occupancy sensor), and control a power and/or dim state of one or more lights. In some instances, the sensors and/or detectors may also control a power state or speed of a fan, such as a ceiling fan. Further, the sensors and/or detectors may detect occupancy in a room or enclosure and control the supply of power to electrical outlets or devices, such as if a room or the structure is unoccupied.

The wireless network devices 710 may also include connected appliances and/or controlled systems, such as refrigerators, stoves and ovens, washers, dryers, air conditioners, pool heaters, irrigation systems, security systems, and so forth, as well as other electronic and computing devices, such as televisions, entertainment systems, computers, intercom systems, garage-door openers, ceiling fans, control panels, and the like. When plugged in, an appliance, device, or system can announce itself to the wireless network as described above and can be automatically integrated with the controls and devices of the wireless network, such as in the smart-home. It should be noted that the wireless network devices 710 may include devices physically located outside of the structure, but within wireless communication range, such as a device controlling a swimming pool heater or an irrigation system.

The wireless network 100 includes a border router 714 that interfaces for communication with an external network, outside the wireless network 100. The border router 714 connects to an access point 716, which connects to a communication network 718, such as the Internet. A cloud service 720, which is connected via the communication network 718, provides services related to and/or using the devices within the wireless network 100. By way of example, the cloud service 720 can include applications for connecting end user devices, such as smart phones, tablets, and the like, to devices in the wireless network, processing and presenting data acquired in the wireless network 100 to end users, linking devices in one or more wireless networks 100 to user accounts of the cloud service 720, provisioning and updating devices in the wireless network 100, and so forth. For example, a user can control the thermostat 702 and other wireless network devices in the smart-home environment using a network-connected computer or portable device, such as a mobile phone or tablet device. Further, the wireless network devices can communicate information to any central server or cloud-computing system via the border router 714 and the access point 716. The data communications can be carried out using any of a variety of custom or standard wireless protocols (e.g., Wi-Fi, ZigBee for low power, BLE, 6LoWPAN, etc.) and/or by using any of a variety of custom or standard wired protocols (CAT6 Ethernet, HomePlug, etc.).

Any of the wireless network devices in the wireless network 100 can serve as low-power and communication nodes to create the wireless network 100 in the smart-home environment. Individual low-power nodes of the network can regularly send out messages regarding what they are sensing, and the other low-powered nodes in the environment—in addition to sending out their own messages—can repeat the messages, thereby communicating the messages from node to node (e.g., from device to device) throughout the wireless network. The wireless network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light and activate the light source when the ambient light sensor detects that the room is dark and when the occupancy sensor detects that someone is in the room. Further, the sensor can include a low-power wireless communication chip (e.g., a ZigBee chip, a Bluetooth chip, a BLE chip, and so forth) that regularly sends out messages regarding the occupancy of the room and the amount of light in the room, including instantaneous messages coincident with the occupancy sensor detecting the presence of a person in the room. As mentioned above, these messages may be sent wirelessly, using the wireless network, from node to node (i.e., smart device to smart device) within the smart-home environment as well as over the Internet to a central server or cloud-computing system.

In other configurations, various ones of the wireless network devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered wireless nodes in the wireless network. In other implementations, the wireless network can be used to automatically turn on and off the lighting units 708 as a person transitions from room to room in the structure. For example, the wireless network devices can detect the person's movement through the structure and communicate corresponding messages via the nodes of the wireless network. Using the messages that indicate which rooms are occupied, other wireless network devices that receive the messages can activate and/or deactivate accordingly. As referred to above, the wireless network can also be utilized to provide exit lighting in the event of an emergency, such as by turning on the appropriate lighting units 708 that lead to a safe exit. The light units 708 may also be turned-on to indicate the direction along an exit route that a person should travel to safely exit the structure.

The various wireless network devices may also be implemented to integrate and communicate with wearable computing devices, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other wireless network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the wireless network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a wireless node device on the wireless network, conforming to the wireless interconnection protocols for communicating on the wireless network.

The wireless network devices 710 may also include a smart alarm clock for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the wireless network based on a unique signature of the person, which is determined based on data obtained from sensors located in the wireless network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 702 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other wireless network devices can use the data to provide other smart-home objectives, such as adjusting the thermostat 702 so as to pre-heat or cool the environment to a desired setting and turning-on or turning-off the lights 708.

In implementations, the wireless network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home and is also referred to as "audio fingerprinting water usage." Similarly, the wireless network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 700 may include one or more wireless network devices that function as a hub 722. The hub 722 may be a general-purpose home automation hub, or an application-specific hub, such as a security hub, an energy management hub, an HVAC hub, and so forth. The functionality of a hub 722 may also be integrated into any wireless network device, such as a smart thermostat device or the border router 714. Hosting functionality on the hub 722 in the structure 712 can improve reliability when the user's internet connection is unreliable, can reduce latency of operations that would normally have to connect to the cloud service 720, and can satisfy system and regulatory constraints around local access between wireless network devices.

Additionally, the example environment 700 includes a smart-speaker 724. The smart-speaker 724 provides voice assistant services that include providing voice control of smart-home devices. The functions of the hub 722 may be hosted in the smart-speaker 724. The smart-speaker 724 can be configured to communicate via the wireless network, Wi-Fi, or both.

Example Device

Figure 8:
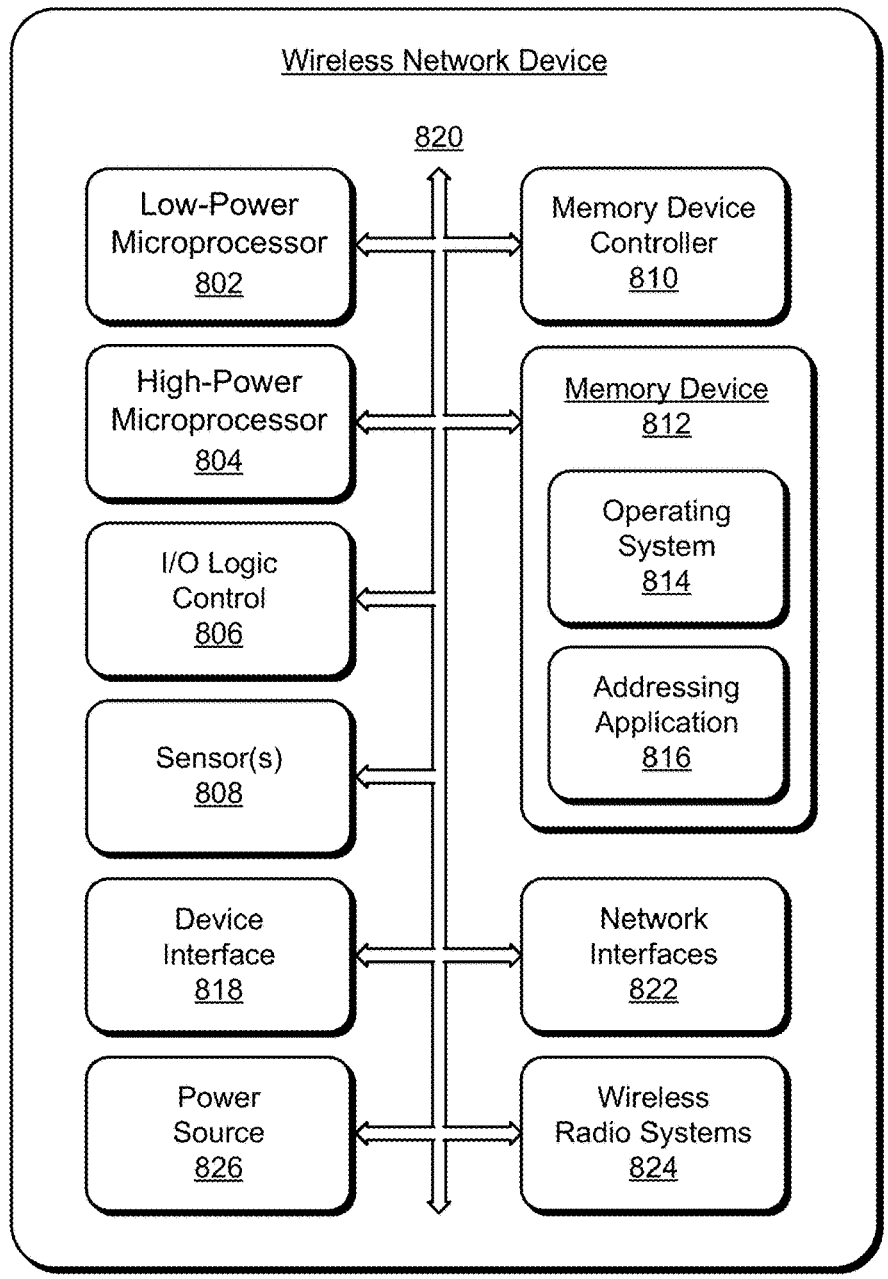
FIG. 8 illustrates an example wireless network device that can be implemented in a wireless network environment in accordance with one or more embodiments of the techniques described herein.

FIG. 8 illustrates an example wireless network device 800 that can be implemented as any of the wireless network devices in a wireless network in accordance with one or more embodiments of network filtering with private resolvable addresses as described herein, such as the source node 102 or the destination node 104. The device 800 can be integrated with electronic circuitry, microprocessors, memory, input output (I/O) logic control, communication interfaces and components, as well as other hardware, firmware, and/or software to implement the device in a wireless network.

In this example, the wireless network device 800 includes a low-power microprocessor 802 and a high-power microprocessor 804 (e.g., microcontrollers or digital signal processors) that process executable instructions. The device also includes an input-output (I/O) logic control 806 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 802 and the high-power microprocessor 804 can also support one or more different device functionalities of the device. For example, the high-power microprocessor 804 may execute computationally intensive operations, whereas the low-power microprocessor 802 may manage less complex processes such as detecting a hazard or temperature from one or more sensors 808. The low-power processor 802 may also wake or initialize the high-power processor 804 for computationally intensive processes.

The one or more sensors 808 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 808 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the wireless network device 800 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The wireless network device 800 includes a memory device controller 810 and a memory device 812, such as any type of a nonvolatile memory and/or other suitable electronic data storage device. The wireless network device 800 can also include various firmware and/or software, such as an operating system 814 that is maintained as computer executable instructions by the memory and executed by a microprocessor. The device software may also include an addressing application 816 that implements embodiments of network filtering with private resolvable addresses. The wireless network device 800 also includes a device interface 818 to interface with another device or peripheral component and includes an integrated data bus 820 that couples the various components of the wireless network device for data communication between the components. The data bus in the wireless network device may also be implemented as any one or a combination of different bus structures and/or bus architectures.

The device interface 818 may receive input from a user and/or provide information to the user (e.g., as a user interface), and a received input can be used to determine a setting. The device interface 818 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 818 may also receive inputs from any number of peripherals, such as buttons, a keypad, a switch, a microphone, and an imager (e.g., a camera device).

The wireless network device 800 can include network interfaces 822, such as a wireless network interface for communication with other wireless network devices in a wireless network, and an external network interface for network communication, such as via the Internet. The wireless network device 900 also includes wireless radio systems 824 for wireless communication with other wireless network devices via the wireless network interface and for multiple, different wireless communications systems. The wireless radio systems 824 may include Wi-Fi, Bluetooth™, Mobile Broadband, and/or point-to-point IEEE 802.15.4. Each of the different radio systems can include a radio device, antenna, and chipset that is implemented for a particular wireless communications technology. The wireless network device 800 also includes a power source 826, such as a battery and/or to connect the device to line voltage. An AC power source may also be used to charge the battery of the device.

In the following text some examples are described:

Example 1: A method of addressing a packet to a destination node by a source node in a wireless network, the method comprising the source node:
hashing an identity resolving key and a value of a random number field to generate an address hash, the identity resolving key being cryptographically-derived from address-generation input data;
forming an advertisement address, the advertisement address including a portion of the address hash;
inserting the advertisement address in an advertising extension packet; and
transmitting the advertising extension packet over the wireless network, the address hash being usable by a destination node to filter the advertising extension packet.

Example 2: The method of example 1, further comprising the source node:
hashing a filter key and the address-input generation data, using a Cipher-based Message Authentication Code, to produce the identity resolving key.

Example 3: The method of example 2, wherein the Cipher-based Message Authentication Code is an Advanced Encryption Standard Cipher-based Message Authentication Code (AES-CMAC).

Example 4: The method of example 2 or example 3, wherein the address-input generation data comprises:
an address-type field;
a network identifier for the wireless network, the wireless network including the source node and the destination node; and
a destination address.

Example 5: The method of example 2 or example 3, wherein the address-input generation data comprises:
an address-type field; and
a network identifier for the wireless network, the wireless network including the source node and the destination node.

Example 6: The method of example 4 or example 5, wherein the destination address is a short address, a long address, or a broadcast address.

Example 7: The method of example 6, wherein the short address is a 16-bit address, wherein the long address is a 64-bit address, and wherein the broadcast address is a 16-bit address.

Example 8: The method of example 6, wherein the wireless network is a Bluetooth wireless network, wherein the short address is a 16-bit destination address, and wherein the long address is a 64-bit destination address.

Example 9: The method of example 2 or example 3, wherein the address-input generation data comprises:
a network identifier for the wireless network, the wireless network including the source node and the destination node.

Example 10: The method of any one of examples 1 to 9, wherein the hashing the identity resolving key and the value of the random number field to form the address hash further comprises:
truncating an output of the hashing to 24 least-significant bits of the output to form the address hash.

Example 11: The method any one of examples 1 to 10, wherein the forming the advertisement address further comprises:
generating a random number;
concatenating a private address type field and the generated random number to form the random number field; and
inserting the random number field in the advertising extension packet.

Example 12: The method of example 11, wherein the random number field is a
Bluetooth prand.

Example 13: The method of any one of examples 1 to 12, wherein the transmitting the advertising extension packet over the wireless network comprises:
transmitting the advertising extension packet using one or more advertising channels.

Example 14: The method of any one of examples 1 to 13, further comprising the source node:
inserting an indication of a data channel and an indication of a time for transmission of a protocol data unit in an advertisement data field of the advertising extension.

Example 15: The method of example 14, further comprising the source node:
transmitting the protocol data unit on the indicated data channel at the indicated time.

Example 16. The method of any one of examples 1 to 15, wherein the wireless network is a Bluetooth Low Energy network, and wherein the advertising extension packet is a Bluetooth Low Energy advertisement packet.

Example 17: The method of any one of examples 1 to 16, the hashing the identity resolving key and the value of the random number field to generate the address hash, further comprising the source node:
concatenating padding bits with the random number before performing the hashing.

Example 18: A method of address filtering of an advertising extension packet by a destination node in a wireless network, the method comprising the destination node:
receiving the advertising extension packet from a source node in the wireless network;
generating a first local hash value based on a value of a random number field included in the received advertising extension packet and a first local filtering identity resolving key;
comparing the first local hash value to a hash value included in the advertising extension packet to determine if the first local hash value matches the hash value included in the advertising extension packet; and
responsive to the first local hash value matching the hash value included in the advertising extension packet, receiving a protocol data unit on a data channel and at a time indicated in the advertising extension packet.

Example 19: The method of example 18, wherein the random number field is a Bluetooth prand.

Example 20: The method of example 18 or example 19, wherein the first local filtering identity resolving key is the only local filtering identity resolving key known to the destination node, further comprising the destination node:
if the first local hash value does not match the hash value included in the advertising extension packet, discarding the received advertising extension packet; and scanning one or more advertising channels for another advertising extension packet.

Example 21: The method of any one of examples 18 to 20, wherein the destination node comprises multiple local filtering identity resolving keys, further comprising the destination node:
if the first local hash value does not match the hash value included in the advertising extension packet, for each of the remaining multiple local filtering identity resolving keys, generating a respective local hash value based on the value of a random number field included in the received advertising extension packet and each of the remaining multiple local filtering identity resolving keys; and
if a respective local hash value matches the hash value included in the advertising extension packet, receiving a protocol data unit on the data channel and at the time indicated in the advertising extension packet.

Example 22: The method of any one of examples 18 to 21, wherein the generating a first local hash value comprises:
hashing a filter key and address-input generation data, using a Cipher-based Message Authentication Code, to produce the identity resolving key.

Example 23: The method of example 22, wherein the Cipher-based Message Authentication Code is an Advanced Encryption Standard Cipher-based Message Authentication Code (AES-CMAC).

Example 24: The method of example 22 or example 23, wherein the address-input generation data comprises one or more of:
an address-type field;
a network identifier for the wireless network, the wireless network including the source node and the destination node; and
a destination address.

Example 25: The method of example 24, wherein the wherein the address-input generation data includes the destination address, and wherein the destination address is a short address or a long address.

Example 26: The method of example 24 or example 25, wherein the wireless network is a Bluetooth wireless network, wherein the short address is a 16-bit destination address of the destination node, and wherein the long address is a 64-bit destination address of the destination node.

Example 27: The method of any one of examples 18 to 26, wherein the receiving the advertising extension packet over the wireless network comprises:
receiving the advertising extension packet over an advertising channel.

Example 28: A wireless network device comprising:
a wireless network interface;
a processor; and
a memory comprising an addressing application configured to perform any one of examples 1 to 27.

Example 29: A wireless network device of example 27, wherein the wireless network device is:
a thermostat;
a hazard detector;
a camera;
a lighting unit;
an entryway interface;
a door lock;
an occupancy sensor;
a ceiling fan;
an electrical outlet;
a security sensor;
a security hub;
a garage door opener;
a control panel;
a border router;
a hub;
a smart-speaker; or
any combination thereof.

Although embodiments of network filtering with private resolvable addresses have been described in language specific to features and/or methods, the subject of the appended claims is not necessarily limited to the specific features or methods described. Rather, the specific features and methods are disclosed as example implementations of network filtering with private resolvable addresses, and other equivalent features and methods are intended to be within the scope of the appended claims. Further, various different embodiments are described, and it is to be appreciated that each described embodiment can be implemented independently or in connection with one or more other described embodiments.

What is claimed is:

1. A method of addressing a packet to a destination node by a source node in a wireless network, the method comprising the source node:
hashing a filter key and address-generation input data, using a Cipher-based Message Authentication Code, to produce an identity resolving key;
hashing the identity resolving key and a value of a random number field to generate an address hash, the identity resolving key being cryptographically-derived from address-generation input data;
forming an advertisement address, the advertisement address including a portion of the address hash;
inserting the advertisement address in an advertising extension packet; and
transmitting the advertising extension packet over the wireless network, the address hash being usable by a destination node to filter the advertising extension packet.

2. The method of claim 1, wherein the address-generation input data comprises:
an address-type field;
a network identifier for the wireless network, the wireless network including the source node and the destination node; and
a destination address.

3. The method of claim 2, wherein the destination address is a short address, a long address, or a broadcast address.

4. The method of claim 1, wherein the address-generation input data comprises:
an address-type field; and
a network identifier for the wireless network, the wireless network including the source node and the destination node.

5. The method of claim 1, wherein the hashing the identity resolving key and the value of the random number field to form the address hash further comprises:
truncating an output of the hashing to 24 least-significant bits of the output to form the address hash.

6. The method of claim 1, wherein the forming the advertisement address further comprises:
generating a random number;
concatenating a private address type field and the generated random number to form the random number field; and
inserting the random number field in the advertising extension packet.

7. The method of claim 1, wherein the transmitting the advertising extension packet over the wireless network comprises:
   transmitting the advertising extension packet using one or more advertising channels.

8. The method of claim 1, further comprising the source node:
   inserting an indication of a data channel and an indication of a time for transmission of a protocol data unit in an advertisement data field of the advertising extension.

9. A method of address filtering of an advertising extension packet by a destination node in a wireless network, the method comprising the destination node:
   receiving the advertising extension packet from a source node in the wireless network;
   generating a first local hash value based on a value of a random number field included in the received advertising extension packet and a first local filtering identity resolving key;
   comparing the first local hash value to a hash value included in the advertising extension packet to determine if the first local hash value matches the hash value included in the advertising extension packet; and
   responsive to the first local hash value matching the hash value included in the advertising extension packet, receiving a protocol data unit on a data channel and at a time indicated in the advertising extension packet.

10. The method of claim 9, wherein the first local filtering identity resolving key is the only local filtering identity resolving key known to the destination node, further comprising the destination node:
    if the first local hash value does not match the hash value included in the advertising extension packet, discarding the received advertising extension packet; and
    scanning one or more advertising channels for another advertising extension packet.

11. The method of claim 9, wherein the destination node comprises multiple local filtering identity resolving keys, further comprising the destination node:
    if the first local hash value does not match the hash value included in the advertising extension packet, for each of the remaining multiple local filtering identity resolving keys, generating a respective local hash value based on the value of a random number field included in the received advertising extension packet and each of the remaining multiple local filtering identity resolving keys; and
    if a respective local hash value matches the hash value included in the advertising extension packet, receiving a protocol data unit on the data channel and at the time indicated in the advertising extension packet.

12. The method of claim 9, wherein the generating the first local hash value comprises:
    hashing a filter key and address-generation input data, using a Cipher-based Message Authentication Code, to produce the identity resolving key.

13. The method of claim 9, wherein the receiving the advertising extension packet over the wireless network comprises:
    receiving the advertising extension packet over an advertising channel.

14. A wireless network device comprising:
    a wireless network interface;
    a processor; and
    a memory comprising instructions for an addressing application executable by the processor to configure the wireless network device to:
    hash a filter key and address-generation input data, using a Cipher-based Message Authentication Code, to produce an identity resolving key;
    hash the identity resolving key and a value of a random number field to generate an address hash, the identity resolving key being cryptographically-derived from address-generation input data;
    form an advertisement address, the advertisement address including a portion of the address hash;
    insert the advertisement address in an advertising extension packet; and
    transmit the advertising extension packet over the wireless network, the address hash being usable by a destination node to filter the advertising extension packet.

15. The wireless network device of claim 14, wherein the address-generation input data comprises:
    an address-type field;
    a network identifier for the wireless network, the wireless network including a source node and the destination node; and
    a destination address.

16. A wireless network device comprising:
    a wireless network interface;
    a processor; and
    a memory comprising instructions for an addressing application executable by the processor to configure the wireless network device to:
    receive an advertising extension packet from a source node in the wireless network;
    generate a first local hash value based on a value of a random number field included in the received advertising extension packet and a first local filtering identity resolving key;
    compare the first local hash value to a hash value included in the advertising extension packet to determine if the first local hash value matches the hash value included in the advertising extension packet; and
    responsive to the first local hash value matching the hash value included in the advertising extension packet, receive a protocol data unit on a data channel and at a time indicated in the advertising extension packet.

17. The wireless network device of claim 16, wherein the first local filtering identity resolving key is the only local filtering identity resolving key known to the wireless network device, the instructions of the addressing application executable to configure the wireless network device to:
    if the first local hash value does not match the hash value included in the advertising extension packet, discard the received advertising extension packet; and
    scan one or more advertising channels for another advertising extension packet.

18. The wireless network device of claim 16, wherein the wireless network device comprises multiple local filtering identity resolving keys, the instructions of the addressing application executable to configure the wireless network device to:
    if the first local hash value does not match the hash value included in the advertising extension packet, for each of the remaining multiple local filtering identity resolving keys, generate a respective local hash value based on the value of a random number field included in the received advertising extension packet and each of the remaining multiple local filtering identity resolving keys; and if a respective local hash value matches the hash value included in the advertising extension packet, receive a protocol data unit on the data channel and at the time indicated in the advertising extension packet.

19. The wireless network device of claim 14, wherein the address-generation input data comprises:
an address-type field; and
a network identifier for the wireless network, the wireless network including a source node and the destination node.

20. The wireless network device of claim 14, wherein the hashing the identity resolving key and the value of the random number field to form the address hash further comprises:
truncating an output of the hashing to 24 least-significant bits of the output to form the address hash; and
wherein the forming the advertisement address further comprises:
generating a random number;
concatenating a private address type field and the generated random number to form the random number field; and
inserting the random number field in the advertising extension packet.

* * * * *